(12) United States Patent
Duffy et al.

(10) Patent No.: US 6,943,570 B2
(45) Date of Patent: Sep. 13, 2005

(54) DEVICE FOR DETECTING A CRACK ON A TURBINE BLADE OF AN AIRCRAFT ENGINE

(75) Inventors: Timothy R. Duffy, Chandler, AZ (US); Eddie Perez-Ruberte, Chandler, AZ (US); Marisol Seda, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 35 days.

(21) Appl. No.: 10/672,444

(22) Filed: Sep. 26, 2003

(65) Prior Publication Data

US 2005/0068050 A1 Mar. 31, 2005

(51) Int. Cl.7 ............................................... G01R 27/08
(52) U.S. Cl. ........................ 324/718; 324/261; 324/262
(58) Field of Search ................................ 324/718, 261, 324/262, 754; 73/104

(56) References Cited

U.S. PATENT DOCUMENTS

| 3,570,304 A | 3/1971 | Mihalyak |
| 4,139,822 A | 2/1979 | Urich et al. |
| 4,468,620 A | 8/1984 | Vaerman |
| 4,741,203 A | 5/1988 | Willaman et al. |
| 5,140,264 A | 8/1992 | Metala et al. |
| 5,293,049 A | 3/1994 | Morey et al. |
| 5,670,879 A | 9/1997 | Zombo et al. |
| 5,748,003 A | 5/1998 | Zoughi et al. |
| 6,426,622 B1 | 7/2002 | Givens et al. |
| 6,452,384 B1 | 9/2002 | Becker et al. |

Primary Examiner—Anjan Deb
Assistant Examiner—Timothy J. Dole
(74) Attorney, Agent, or Firm—Miriam Jackson, Esq.

(57) ABSTRACT

An apparatus for inspecting a turbine blade of an aircraft engine may include a shaft having a proximate end and a distal end, an attachment device coupled to the distal end of the shaft and capable of being attached to a strut of the aircraft engine and an engagement device, coupled to the attachment device, capable of moving away from the attachment device and attaching to a trailing edge of the turbine blade. The apparatus may also include a probe moveably coupled to the engagement device and capable of moving along a leading edge of the turbine blade to detect a surface anomaly of the turbine blade and a control device for controlling the movement of the probe along the leading edge of the turbine engine in response to user manipulation.

20 Claims, 2 Drawing Sheets ined. For example, the turbo fan jet engine 100 may
DEVICE FOR DETECTING A CRACK ON A TURBINE BLADE OF AN AIRCRAFT ENGINE

BACKGROUND OF THE INVENTION

1. Field of the Invention

The present invention relates generally to a device for inspecting an aircraft engine, and more particularly to a device for detecting a crack on a turbine blade of an aircraft engine.

2. Description of the Related Art

Aircraft engines have many components that need to be inspected on a regular basis to ensure they are not damaged due to stress, fatigue and other external conditions. In some instances, the components of the aircraft engine may be visually inspected for damage when the aircraft is at the gate. However, in many instances, the aircraft engine needs to be disassembled and then inspected to determine if any of the components are damaged. For example, the turbine blades of an aircraft engine may have hairline cracks due to stress and fatigue but cannot be inspected without disassembling the engine, which may require several hours to complete. Only then, can an aircraft technician inspect the turbine blades visually or with specialized equipment.

FIG. 1 is a cross-sectional side view of a prior art turbo fan jet engine 100. The turbo fan jet engine 100 includes many components that need to be inspected, however, for purposes of this disclosure, only a few components will be identified. For example, the turbo fan jet engine 100 may include high pressure turbine blades 102, first low pressure turbine blades 104, second low pressure turbine blades 106, third low pressure turbine blades 108, a strut 110, a mixer nozzle 112 and a tail pipe 114. The turbine blades 102, 104, 106, 108 rotate around a central axis 116 for generating an air flow that is emitted from the tail pipe 114. Each turbine blade 102, 104, 106, 108 includes a leading edge 118, 120, 122, 124 and a trailing edge 126, 128, 130, 132, respectively. Each turbine blade 102, 104, 106, 108 can have a crack, which can go undetected unless the turbo fan jet engine 100 is disassembled and inspected. As shown in FIG. 1, the turbo fan jet engine 100 has many components located in a compact space, thus making the visual inspection of the turbine blades 102, 104, 106, 108 very difficult, if not impossible.

Thus, it should be appreciated that there is a need for a device for inspecting a turbine blade of an aircraft engine and detecting a crack in the turbine blade without disassembling the aircraft engine. The present invention fulfills this need as well as others.

SUMMARY OF THE INVENTION

The present invention relates to an apparatus for inspecting a turbine blade of an aircraft engine. In particular, and by way of example only, one embodiment of the present invention is an apparatus, which may include a shaft having a proximate end and a distal end, an attachment device coupled to the distal end of the shaft and capable of being attached to a strut of the aircraft engine and an engagement device, moveably coupled to the attachment device, capable of moving away from the attachment device and attaching to a trailing edge of the turbine blade. The apparatus may also include a probe, moveably coupled to the engagement device, capable of moving along a leading edge of the turbine blade to detect a surface anomaly of the turbine blade and a control device for controlling the movement of the probe along the leading edge of the turbine blade in response to user manipulation.

Another embodiment of the present invention is a device for accessing and inspecting a turbine of an aircraft engine without removal of the turbine from the aircraft engine. The device may include a tube having a proximate end and a distal end, a handle attached to the proximate end of the shaft, a blade engager coupled to the distal end of the tube and capable of moveably coupling to a trailing edge of a turbine blade and a sensor coupled to the blade engager and capable of moving along a leading edge of the turbine blade to detect an anomaly of the turbine blade.

Another embodiment of the present invention is an apparatus for detecting a crack in a blade of an aircraft engine. The apparatus may include a tube having a proximate end and a distal end, a handle coupled to the proximate end of the tube and an attachment device coupled to the distal end of the tube and capable of being removably coupled to a strut of the aircraft engine. The apparatus may also include a plate moveably coupled to the attachment device, a device, coupled to the plate, capable of being removably coupled to a trailing edge of the blade and a probe positioned adjacent to the device and capable of traveling along a leading edge of the blade to detect a crack in the blade.

These and other features and advantages of the embodiments of the invention will become apparent from the following detailed description, taken in conjunction with the accompanying drawings, which illustrate, by way of example the principles of the invention.

DETAILED DESCRIPTION OF THE PRESENTLY PREFERRED EMBODIMENTS

Devices that implement the embodiments of the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
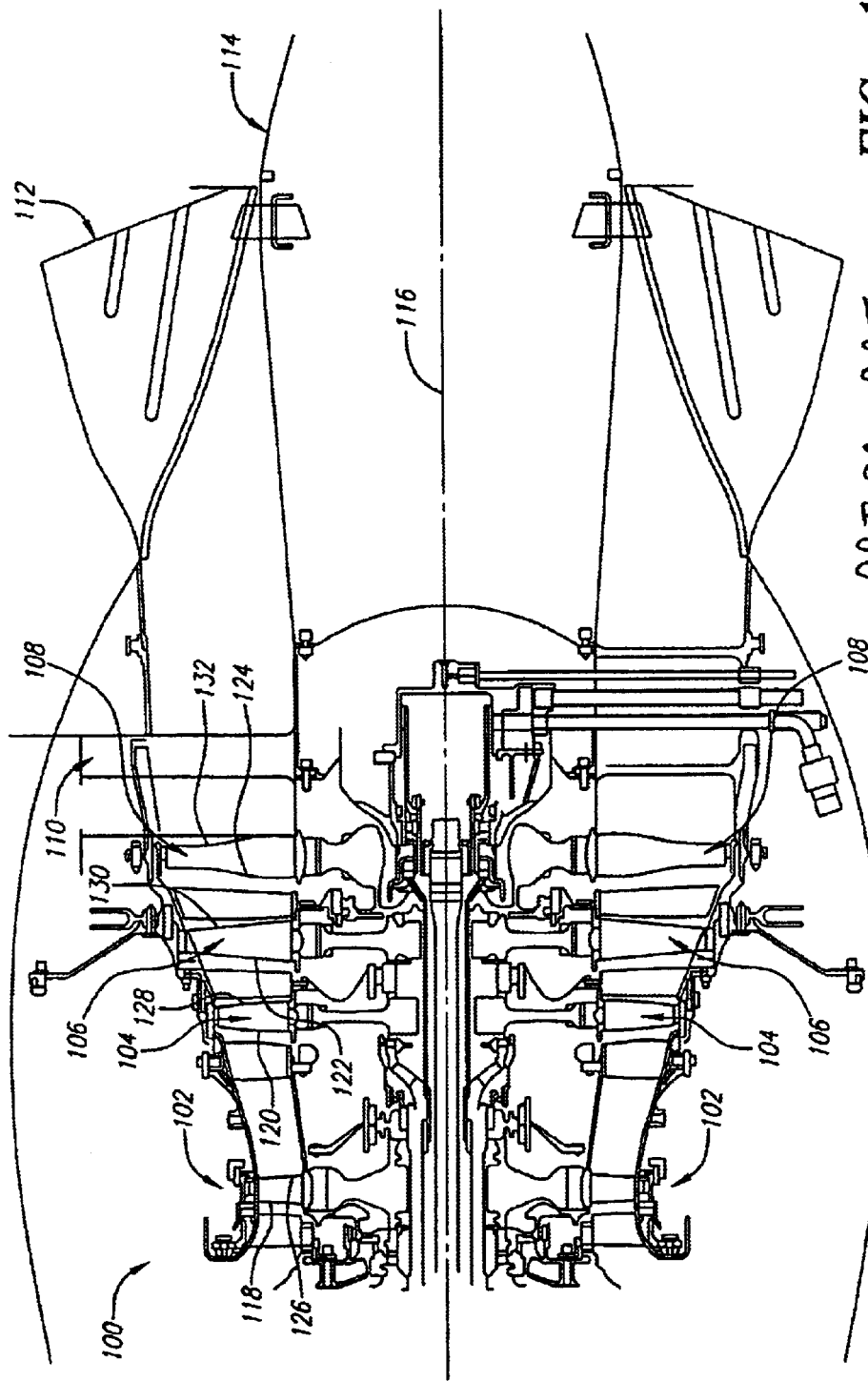
FIG. 1 is a cross-sectional side view of a prior art turbo fan jet engine.
Figure 2:
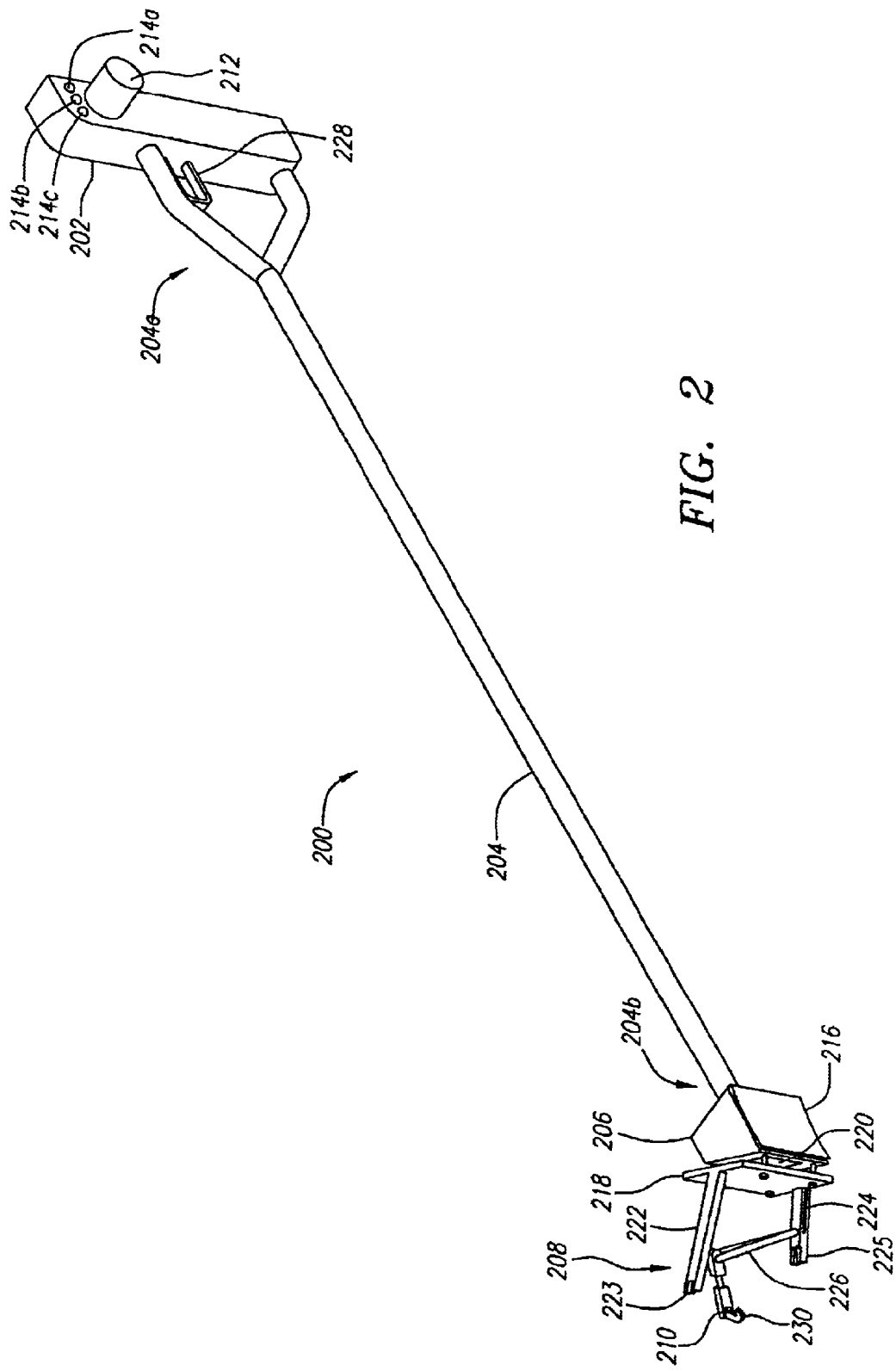
FIG. 2 is a perspective view of a device for inspecting the turbine blades of the turbo fan jet engine of FIG. 1 and detecting a crack, if present, on the leading edge of the turbine blades in accordance with a preferred embodiment of the present invention.

Referring now more particularly to the drawings, FIG. 2 is a perspective view of a device 200 for inspecting the turbine blades 108 of the turbo fan jet engine 100 of FIG. 1 and detecting a crack or cracks, if present, on the leading edge of the turbine blades 108. The device 200 may be used to inspect the turbine blades 108 and detect damage, e.g., a crack, to the turbine blades 108 without disassembling the engine 100. To inspect the turbine blades 108, an aircraft technician can stand behind the tail pipe 114, insert the device 200 into the engine 100 and position the device 200 to contact the turbine blades 108. Hence, the device 200 advantageously provides the aircraft technician with the ability to inspect each turbine blade 108, one at a time, for damage without disassembling the engine 100. After one turbine blade 108 is inspected, the next turbine blade 108 can be inspected by rotating a fan blade, which is connected to the turbine blades 108, to properly position the turbine blade 108 of interest. In one embodiment, the device 200 is preferably made of a metallic material such as aluminum.

The device 200 may include a handle 202, a tube (or shaft) 204 coupled to the handle 202, an attachment device 206 coupled to the tube 204, a blade engager 208 moveably coupled to the attachment device 206 and a probe 210 (e.g., a sensor) capable of moving adjacent to or along the blade engager 208. The device 200 may also include a probe movement device 212 for controlling the movement of the probe 210, which may move along the turbine blade 108. The probe movement device 212 may be a knob (as shown in FIG. 2) that can be turned clockwise to move the probe 210 toward the outer portion of the turbine blade 108 and counter-clockwise to move the probe 210 toward the inner portion of the turbine blade 108. In one embodiment, the probe movement device 212 may be an electronic switch that can move the probe 210 in multiple (e.g., upward and downward) directions or allow the probe 210 to be maintained in a relatively stationary position or any other device capable of moving the probe 210 along the turbine blade 108. When the probe movement device 212 is a knob, the knob controls the movement of the probe 210 by a string that uses a pulley to move the probe 210. When the probe movement device 212 is an electronic switch, the electronic switch may transmit electronic signals to move the probe 210.

The tube 204 has a proximate end 204a coupled to the handle 202 and a distal end 204b coupled to the attachment device 206. In the illustrated embodiment, the proximate end 204b of the tube 204 has a "Y" shape for providing better support and attachment to the handle 202. The tube may be hollow and have a length of about 1.016 meters. The string or conductor, which is used to connect the probe movement device 212 to the probe 210, may be positioned within the tube 204. In one embodiment, the tube 204 is preferably made of a metallic material such as aluminum.

The handle 202 may also include a number of light emitting diodes (LEDs) 214 to indicate that the device 200 has been properly attached to or positioned within the engine 100 for inspecting the turbine blade 108 of interest. For example, in the illustrated embodiment, the handle 202 includes a first LED 214a for indicating when the blade engager 208 (e.g., the first arm 222) is properly attached to (or in contact with) the outer or upper portion of the turbine blade 108 to be inspected, a second LED 214b for indicating when the blade engager 208 (e.g., the second arm 224) is properly attached to (or in contact with) the inner or lower portion of the turbine blade 108 to be inspected, and a third LED 214c for indicating when the probe 210 (or a probe holder 230) is locked in position with the leading edge 124 of the turbine blade 108 to be inspected.

The attachment device 206 may be a metallic hollow block having a trapezoidal shape where one side of the block is connected with the distal end 204b of the tube 204, the opposite side of the block is connected to the blade engager 208 and another side of the block includes an apparatus 216 for attachment to the strut 110. The apparatus 216 may be a clip, a magnet, a tape or any other device capable of being attached to the strut 110.

The blade engager 208 maybe a device capable of removably attaching to or being positioned adjacent to the trailing edge 132 of the turbine blade 108. In one embodiment, the blade engager 208 may include a plate 218, a spring 220, a first arm 222 having a groove 223, a second arm 224 having a groove 225 and a rod 226 connecting the first arm 222 to the second arm 224. The grooves 223, 225 are typically positioned at the end of the arms 222, 224 opposite the plate 218. The blade engager 208 may be moveably coupled to the attachment device 206 for moving toward and away from the attachment device 206. The spring 220 is positioned between the attachment device 206 and the plate 218 and extends as the plate 218 is moved away from the attachment device 206. The grooves 223, 225 are sized and shaped so that the trailing edge 132 of the turbine blade 108 can fit within the grooves 223, 225. In one embodiment, the first arm 222 has a length greater than the second arm 224.

The device 200 may also include a blade engager movement device 228 for controlling the movement of the blade engager 208 so that the grooves 223, 225 engage the trailing edge 132 of the turbine blade 108. In one embodiment, the blade engager movement device 228 is a trigger that releases and pulls a string, which is attached to the plate 218, to move the plate 218 away from and toward the turbine blade 108. For example, when the trigger is released, the spring 220 expands pushing the plate 218 away from the attachment device 206. When the trigger is pushed, the string pulls the plate 218 toward the attachment device 206, thus compressing the spring 220. The blade engager movement device 228 can be an electronic switch that can move the blade engager 208 in multiple (e.g., upward and downward) directions or allow the blade engager 208 to be maintained in a relatively stationary position or any other device capable of moving the blade engager 208 toward and away from the turbine blade 108. The aircraft technician can couple the apparatus 216 to the strut 110, position the blade engager 208 adjacent to the turbine blade 108 to be inspected and then move the blade engager 208 using the blade engager movement device 228 so that the grooves 223, 225 engage the trailing edge 132 of the turbine blade 108. Thereafter, the probe 210 can be positioned using the probe movement device 212 to move along the leading edge 124 of the turbine blade 108 to detect surface anomalies such as cracks.

The device 200 may also include a probe holder 230 moveably coupled to the rod 226 that traverses along the rod 226 from the first arm 222 to the second arm 224 and vice versa. The probe 210 is positioned on the inner curve of the probe holder 230. The probe holder 230 can be slidably coupled to the leading edge 124 of the turbine blade 108 so that it can travel along the leading edge 124 of the turbine blade 108. As the probe holder 230 travels along the leading edge 124 of the turbine blade 108, the probe 110 may detect a crack on the turbine blade 108. In one embodiment, the probe 210 includes two coils that are positioned adjacent to one another and that may be energized by an electrical current. When the probe 210 is traveling adjacent to the leading edge 124 of the turbine blade 108, each coil maybe positioned on one side of the leading edge 124 such that a magnetic field is created between the two coils. The combination of the two coils and the material to be inspected (e.g., the turbine blade 108) form a circuit. The probe 210 may sense a change in impedance of the circuit, which indicates a crack in the turbine blade 108. For example, a spike in the impedance may indicate a crack in the turbine blade 108.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the present invention is not intended to be limited by the preferred embodiments, but is to be defined by reference to the appended claims.

What is claimed is:

1. An apparatus for inspecting a turbine blade of an aircraft engine, comprising:
    a shaft having a proximate end and a distal end;
    an attachment device coupled to the distal end of the shaft and capable of being attached to a strut of the aircraft engine;
    an engagement device, moveably coupled to the attachment device, capable of moving away from the attachment device and attaching to a trailing edge of the turbine blade;
    a probe, moveably coupled to the engagement device, capable of moving along a leading edge of the turbine blade to detect a surface anomaly of the turbine blade; and
    a control device for controlling the movement of the probe along the leading edge of the turbine blade in response to user manipulation.

2. The apparatus as defined in claim 1, further comprising a handle coupled to the proximate end of the shaft.

3. The apparatus as defined in claim 2, wherein the control device is coupled to the handle.

4. The apparatus as defined in claim 1, wherein the probe is a sensor.

5. The apparatus as defined in claim 1, wherein the control device is a knob or an electronic switch.

6. The apparatus as defined in claim 1, wherein the attachment device includes a device for attachment to the strut of the aircraft engine.

7. The apparatus as defined in claim 6, wherein the device is selected from a group consisting of a clip, a magnet, a tape and combinations thereof.

8. The apparatus as defined in claim 1, wherein the engagement device includes an arm having a groove capable of attaching to the trailing edge of the turbine blade.

9. The apparatus as defined in claim 1, wherein the engagement device includes:
    a plate positioned adjacent to the attachment device;
    a spring positioned between the plate and the attachment device;
    a first arm attached to the plate and having a groove for receiving the trailing edge of the turbine blade;
    a second arm attached to the plate and having a groove for receiving the trailing edge of the turbine blade, the second arm being spaced apart from the first arm;
    a rod connecting the first arm to the second arm; and
    a probe holder having the probe attached thereto and capable of moving along the rod and the leading edge of the turbine blade.

10. A device for accessing and inspecting a turbine of an aircraft engine without removal of the turbine from the aircraft engine and without removal of the aircraft engine from the aircraft, comprising:
    a tube having a proximate end and a distal end;
    a handle attached to the proximate end of the tube;
    a blade engager coupled to the distal end of the tube and capable of moveably coupling to a trailing edge of a turbine blade; and
    a sensor coupled to the blade engager and capable of moving along a leading edge of the turbine blade to detect an anomaly of the turbine blade.

11. The device as defined in claim 10, further comprising an apparatus coupled to the distal end of the shaft and capable of being coupled to a strut of the aircraft engine.

12. The device as defined in claim 11, wherein the apparatus is selected from a group consisting of a clip, a magnet, a tape and combinations thereof.

13. The device as defined in claim 10, wherein the blade engager includes an arm having a groove that is removably coupled to the trailing edge of the turbine blade.

14. The device as defined in claim 13, wherein the handle includes a light emitting diode to indicate whether the groove is coupled to the trailing edge of the turbine blade.

15. The device as defined in claim 10, further comprising a knob coupled to the handle for moving the probe along the leading edge of the turbine engine in response to user manipulation.

16. An apparatus for detecting a crack in a blade of an aircraft engine, comprising:
    a tube having a proximate end and a distal end;
    a handle coupled to the proximate end of the tube;
    an attachment device coupled to the distal end of the tube and capable of being removably coupled to a strut of the aircraft engine;
    a plate moveably coupled to the attachment device;
    a device, coupled to the plate, capable of being removably coupled to a trailing edge of the blade; and
    a probe positioned adjacent to the device and capable of traveling along a leading edge of the blade to detect a crack in the blade.

17. The apparatus as defined in claim 16, further comprising a probe movement device for controlling the movement of the probe along the leading edge of the blade in response to user manipulation.

18. The apparatus as defined in claim 16, wherein the attachment device is selected from a group consisting of a clip, a magnet, a tape and combinations thereof.

19. The apparatus as defined in claim 16, wherein the device includes an arm having a groove therein.

20. The apparatus as defined in claim 16, wherein the probe detects the crack by sensing a change in the impedance.

* * * * *